United States Patent
Marin et al.

(10) Patent No.: US 9,919,806 B2
(45) Date of Patent: Mar. 20, 2018

(54) DEVICE AND METHOD FOR CONTROLLING AN AUXILIARY ENGINE SUITABLE FOR SUPPLYING THRUST POWER TO THE ROTOR OF A HELICOPTER

(71) Applicant: SAFRAN HELICOPTER ENGINES, Bordes (FR)

(72) Inventors: Jean Philippe Jacques Marin, Jurancon (FR); Matthieu Gallot, Ribarrouy (FR); Philippe Etchepare, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/533,986

(22) PCT Filed: Jan. 11, 2016

(86) PCT No.: PCT/FR2016/050038
§ 371 (c)(1),
(2) Date: Jun. 7, 2017

(87) PCT Pub. No.: WO2016/113489
PCT Pub. Date: Jul. 21, 2016

(65) Prior Publication Data
US 2017/0334569 A1    Nov. 23, 2017

(30) Foreign Application Priority Data
Jan. 12, 2015   (FR) ..................... 15 50209

(51) Int. Cl.
*B64D 31/08*      (2006.01)
*B64C 27/12*      (2006.01)
(Continued)

(52) U.S. Cl.
CPC .............. *B64D 31/06* (2013.01); *B64C 27/06* (2013.01); *B64C 27/12* (2013.01); *B64D 27/10* (2013.01);
(Continued)

(58) Field of Classification Search
CPC ........ B64D 31/06; B64D 27/10; B64D 34/08; B64D 41/00; B64C 27/12; B64C 17/10; F02C 3/04; F02C 6/02
(Continued)

(56) References Cited

U.S. PATENT DOCUMENTS

| 4,423,593 | A | * | 1/1984 | Zagranski | ................. | F02C 9/28 |
| | | | | | | 60/39.281 |
| 4,993,221 | A | * | 2/1991 | Idelchik | .................... | F02C 9/28 |
| | | | | | | 60/39.281 |

(Continued)

OTHER PUBLICATIONS

International Search Report with English language translation, dated Apr. 6, 2016, International Application No. PCT/FR2016/050038.

(Continued)

*Primary Examiner* — Yazan A Soofi
(74) *Attorney, Agent, or Firm* — Womble Bond Dickinson (US) LLP

(57) ABSTRACT

The invention relates to a device for controlling an auxiliary engine (8) comprising a gas generator and a free turbine suitable for being able to be connected mechanically to the rotor (12) of a helicopter in order to supply it with thrust power, characterised in that said control device comprises a proportional-integral controller (30) having a proportional gain (Kp) and an integral gain (Ki), which are dependent on the rotation speed of said gas generator, said controller (30) being configured to receive an error signal representing a speed error of said free turbine, and to generate a signal (Sc) for correcting the drive speed of said gas generator obtained (Continued)

Figure 1:
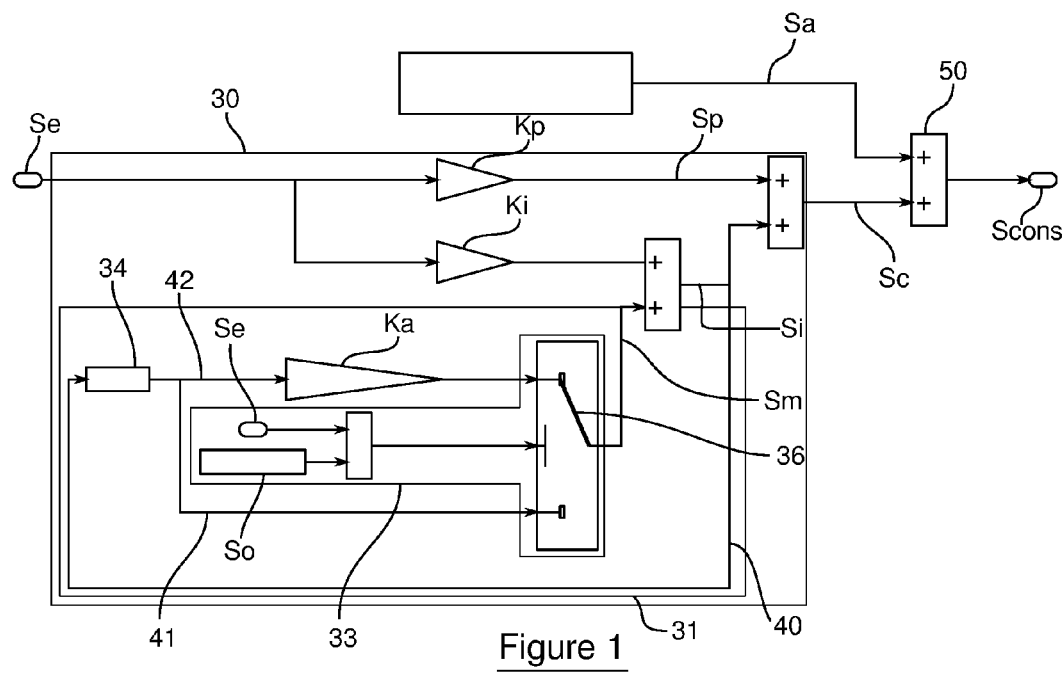

by adding a signal proportional to said error signal in accordance with said proportional gain (Kp), and an integrated signal (Si) resulting from the addition of a signal proportional to said error signal in accordance with said integral gain (Ki) and a memory signal (Sm), supplied by a feedback loop (31) of said integrated signal (Si), said memory signal (Sm) being dependent on a measurement representing the rotation speed of said free turbine.

10 Claims, 2 Drawing Sheets

(51) Int. Cl.

| | | |
|---|---|---|
| *B64C 27/10* | (2006.01) | |
| *B64D 27/10* | (2006.01) | |
| *B64D 35/08* | (2006.01) | |
| *B64D 41/00* | (2006.01) | |
| *F02C 6/02* | (2006.01) | |
| *F02C 3/04* | (2006.01) | |
| *B64D 31/06* | (2006.01) | |
| *B64C 27/06* | (2006.01) | |

(52) U.S. Cl.
CPC ............ *B64D 35/08* (2013.01); *B64D 41/00* (2013.01); *F02C 3/04* (2013.01); *F02C 6/02* (2013.01); *F05D 2220/329* (2013.01); *F05D 2220/50* (2013.01); *F05D 2270/304* (2013.01); *F05D 2270/705* (2013.01)

(58) Field of Classification Search
USPC .......................................................... 701/100
See application file for complete search history.

(56) References Cited

U.S. PATENT DOCUMENTS

| | | | | |
|---|---|---|---|---|
| 6,112,719 | A * | 9/2000 | Earleson | .............. G05B 13/024 |
| | | | | 123/352 |
| 7,073,335 | B2 * | 7/2006 | Gerdes | .................... F01D 15/10 |
| | | | | 290/52 |
| 8,275,500 | B2 * | 9/2012 | Buehman | .................. F02C 9/56 |
| | | | | 244/17.11 |
| 8,555,653 | B2 * | 10/2013 | Snider | .................... F01D 19/00 |
| | | | | 60/773 |
| 2014/0145028 | A1 * | 5/2014 | Gomez | .................. B64C 27/12 |
| | | | | 244/58 |

OTHER PUBLICATIONS

Written Opinion of the International Searching Authority with French translation cover sheet, dated Apr. 6, 2016, International Application No. PCT/FR2016/050038.

* cited by examiner

DEVICE AND METHOD FOR CONTROLLING AN AUXILIARY ENGINE SUITABLE FOR SUPPLYING THRUST POWER TO THE ROTOR OF A HELICOPTER

1. TECHNICAL FIELD OF THE INVENTION

The invention relates to the control of the auxiliary engines arranged in architectures of multi-engine helicopters, and in particular control of the auxiliary engines suitable for supplying extra thrust power in addition to the thrust power supplied by the main engines of the helicopter.

2. TECHNOLOGICAL BACKGROUND

Helicopters are generally equipped with main engines that are used to propel the helicopter and with one or more auxiliary engines. The auxiliary engines are small gas turbines (generally referred to by the acronym APU, standing for auxiliary power unit), the main function of which is to supply non-thrust power—electrical, mechanical, hydraulic and/or pneumatic—in the flight phases in which the main engines are not in a position to do so (on the ground, in the takeoff or landing phases, in search phases, etc).

US-A1-2014/145028 describes a helicopter comprising two main thrust engines and a main system for controlling these two engines.

This helicopter also comprises a secondary thrust engine associated with a second control system independent of the main control system. This second control system controls the secondary engine according to a constant setpoint. Because of this, the secondary engine cannot be controlled using a speed error of the free turbine of the secondary engine, which has the drawback of possibly requiring balancing with the main engines of the helicopter.

It has also been proposed by the applicant, in particular in the patent application FR 2 992 024, to use the auxiliary engines not only to supply non-thrust power but also, in certain flight phases, to supply extra thrust power, in addition to the thrust power of the main engines.

In the context of such use of an auxiliary engine, for supplying both thrust and non-thrust power, one of the difficulties that is posed now is being able to control this auxiliary engine at low and controlled droop, so as to be able to adapt the thrust power delivered by this engine according to the flight conditions of the helicopter. The problem is posed in particular of being able to control the auxiliary engine without having an impact on the functioning of the main engines.

3. OBJECTIVES OF THE INVENTION

The invention therefore aims to provide a device and method for controlling an auxiliary engine of a helicopter suitable for supplying thrust power in addition to the main engines. The invention aims in particular to provide a device and method for controlling an auxiliary engine that does not require balancing with the main engines of the helicopter.

The invention also aims to provide a device and method for controlling an auxiliary engine that does not have an impact on the functioning and performances of the main engines. In other words, the invention aims to provide a control method that is transparent for the helicopter pilot.

The invention also aims to provide a helicopter architecture comprising a control device according to the invention.

4. DISCLOSURE OF THE INVENTION

To do this, the invention relates to a device for controlling an auxiliary engine comprising a gas generator and a free turbine suitable for being able to be connected mechanically to the rotor of a helicopter in order to supply it with thrust power in addition to thrust power supplied by the main engines.

A control device according to the invention is characterised in that it comprises a proportional-integral controller having a proportional gain and an integral gain, which are dependent on the rotation speed of said gas generator of said auxiliary engine of the helicopter, said controller being configured to receive a signal representing a speed error of said free turbine of said auxiliary engine, referred to as an error signal, and to generate a signal for correcting the drive speed of said gas generator of said auxiliary engine, said correction signal being obtained by adding a signal proportional to said error signal in accordance with said proportional gain, and a signal, referred to as an integrated signal, resulting from the addition of a signal proportional to said error signal in accordance with said integral gain and a signal, referred to as a memory signal, supplied by a feedback loop of said integrated signal, said memory signal being dependent on a measurement representing the rotation speed of said free turbine of said auxiliary engine.

A device for controlling an auxiliary engine according to the invention therefore makes it possible to control the operating speed of the auxiliary engine without requiring an exchange of data between this auxiliary engine and the main engines of the helicopter. In particular, a control device according to the invention allows control of the thrust power supplied by the auxiliary engine to the rotor of the helicopter without requiring balancing with the main engines. The control device is self-contained and is based solely on the rotation speed of the free turbine and the rotation speed of the gas generator of the auxiliary engine.

As an input, the control device receives an error signal that is obtained for example by a subtracter able to calculate the difference between a setpoint speed and a measurement of the speed of the free turbine.

A correction signal is then determined by adding a signal proportional to said error signal and a signal, referred to as an integrated signal, said integrated signal being obtained by adding a signal proportional to said error signal in accordance with said integral gain and a signal, referred to as a memory signal, supplied by a feedback loop of said integrated signal, said memory signal being dependent on a measurement representing the rotation speed of said free turbine of said auxiliary engine.

Advantageously and according to the invention, said feedback loop comprises:
- a first circuit configured to supply a memory signal that is an image of said integrated signal,
- a second circuit configured to supply a memory signal proportional to said integrated signal in accordance with a gain, referred to as a cancellation gain, of less than 1,
- a selector configured to select said first circuit or said second circuit according to the results of a test on a measurement representing the rotation speed of said free turbine of said auxiliary engine.

According to this variant, the integrated signal that is obtained by adding a signal proportional to said error signal and a memory signal is obtained either by a conventional integral control (the first circuit of the feedback loop), or by a compensated integral control (the second circuit of the feedback loop, also hereinafter referred to as the compensation circuit), the feedback loop of which is corrected by a memory cancellation gain. The choice between the two types of control is made in accordance with a test on a measurement representing the rotation speed of the free turbine of said auxiliary engine.

In other words, according to this advantageous variant, the integral control supplies a correction that is either an image of the integrated error in a conventional fashion (the first circuit of the loop), or a correction that tends to be cancelled (the compensation circuit). In the first case, the control device then behaves as a conventional proportional-integral controller. In the second case, the signal output from the integrator is progressively cancelled when the control error of the rotation speed of the free turbine is small (since it is controlled by the main engines) and the control device allows control of the engine at the target operating point chosen. In other words, a control device according to this variant has two operating modes dependent on the results of a test on a measurement representing the rotation speed of the free turbine of the auxiliary engine.

Advantageously and according to the invention, said test performed by said selector consists in comparing said error signal with a predetermined droop threshold so as to be able to activate said first circuit if the speed error is higher than said predetermined droop threshold and to activate said second circuit if the speed error is lower than said threshold, such that said integrated signal is gradually cancelled.

According to this variant, if the control error is higher than the predetermined droop threshold, the controller behaves as a conventional proportional-integral controller. On the other hand, if the control error is lower than the predetermined droop threshold, the controller can cause the auxiliary engine to operate at the target operating point chosen, for example with regard to its anticipated power.

In other words, for a flight phase without rapid variation in the necessary power, the control device makes it possible, by gradually cancelling the integrator, to control the engine at the chosen operating point.

For a flight phase requiring a rapid variation in power, the controller regains conventional proportional-integral controller behaviour.

According to another variant, said cancellation gain of said second loop is dependent on the speed error of said free turbine of said auxiliary engine.

According to this variant, the cancellation gain is dependent on the error of the speed of the free turbine of the auxiliary engine, which makes it possible to omit the threshold-condition selector.

Advantageously, a control device according the invention further comprises an adder configured to add said correction signal generated by said proportional-integral controller and a signal corresponding to a target operating point of said auxiliary engine dependent on said flight conditions of the helicopter, to supply a setpoint signal to said gas generator of said auxiliary engine.

The invention also relates to an architecture of a multi-engine helicopter comprising a thrust power unit comprising main engines suitable for being connected to a power transmission box driving a rotor of the helicopter, and an auxiliary engine comprising a gas generator and a free turbine, said auxiliary engine being suitable for being able to be connected firstly to an on-board system of the helicopter in order to be able to supply said on-board system with electrical energy on the ground, and secondly to said thrust power unit in order to be able to supply extra thrust power during a flight of the helicopter.

An architecture according to the invention is characterised in that said architecture further comprises a device for controlling said auxiliary engine according to the invention, so as to be able to adapt, during a flight of the helicopter, the thrust power supplied by said auxiliary engine to said thrust power unit, independently of any balancing between said main engines and the auxiliary engine.

An architecture according to the invention makes it possible to have an auxiliary engine which supplies non-thrust power, in particular electrical power, to the on-board system of the helicopter, when the helicopter is on the ground, and which supplies thrust power during certain flight phases, this thrust power being controlled without requiring a balancing of power with the main engines of the helicopter.

An architecture according to the invention is therefore particularly efficient and makes it possible to optimise the use of an auxiliary engine without nevertheless having an impact on the functioning of the other components of the architecture, in particular the main engines.

The invention also relates to a helicopter comprising an architecture according to the invention.

The invention also relates to a method for controlling an auxiliary engine suitable for supplying thrust power to a helicopter rotor, characterised in that it comprises the following steps:
  receiving a signal representing a speed error of said free turbine of said auxiliary engine, referred to as an error signal,
  generating a signal for correcting the drive speed of said gas generator of said auxiliary engine resulting from the addition of a signal proportional to said error signal in accordance with a proportional gain, and a signal, referred to as an integrated signal, resulting from the addition of a signal proportional to said error signal in accordance with an integral gain and a signal, referred as a memory signal, dependent on a measurement representing the rotation speed of said free turbine of said auxiliary engine.

Advantageously and according to the invention, said memory signal is a signal obtained by a selection between a signal that is an image of said integrated signal and a signal proportional to said integrated signal in accordance with a gain, referred to as a cancellation gain, of less than 1, the selection being dependent on the results of a test on a measurement representing the rotation speed of said free turbine of said auxiliary engine.

In other words, according to this variant, the integral control is a control obtained by a selection between a conventional integral control and an integral control, referred to as a compensation integral control, obtained by looping back the integrator using a gain of less than 1, the selection being dependent on the results of a test on a measurement representing the rotation speed of the free turbine of said auxiliary engine.

Advantageously and according to the invention, said selection test consists in comparing said error signal with a predetermined droop threshold and choosing said signal that is an image of the integrated signal if the speed error, in absolute value, is higher than said predetermined droop threshold and choosing said signal proportional to said integrated signal in accordance with said cancellation gain if the speed error, in absolute value, is lower than said threshold.

In other words, conventional integral control is chosen if the speed error is higher than said predetermined droop threshold and the compensated integral control is chosen if the speed error is lower than said threshold.

The control device according to the invention advantageously implements the control method according to the invention, and the control method according to the invention is advantageously implemented by a control device according to the invention.

The invention also relates to a control device, an architecture, a helicopter and a control method characterised in combination by all or some of the features mentioned above or below.

5. LIST OF FIGURES

Figure 2:
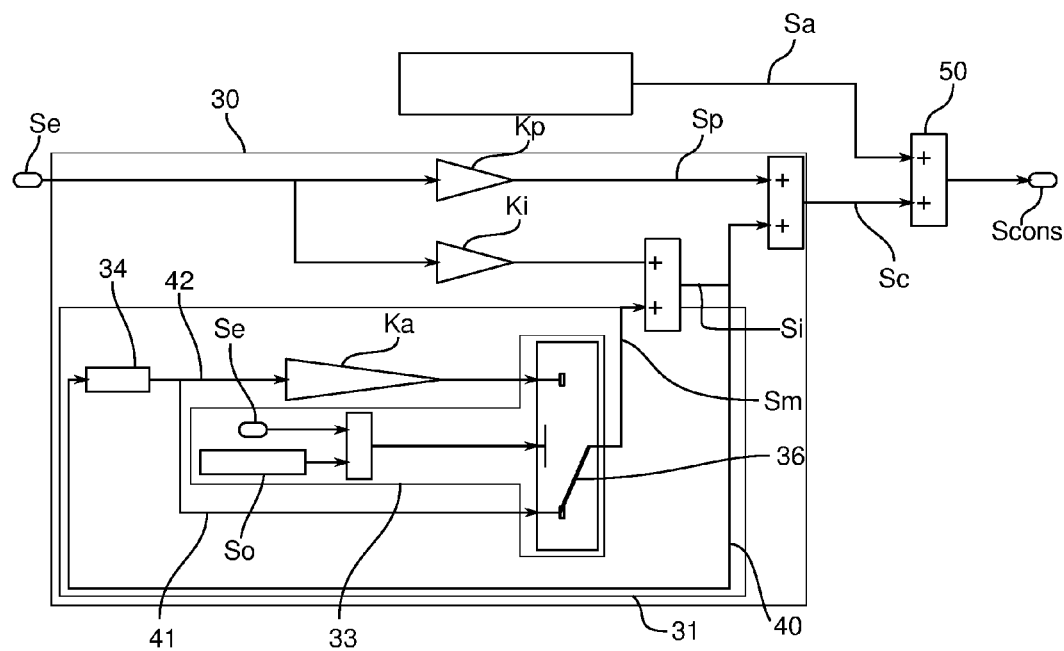
Figure 3:
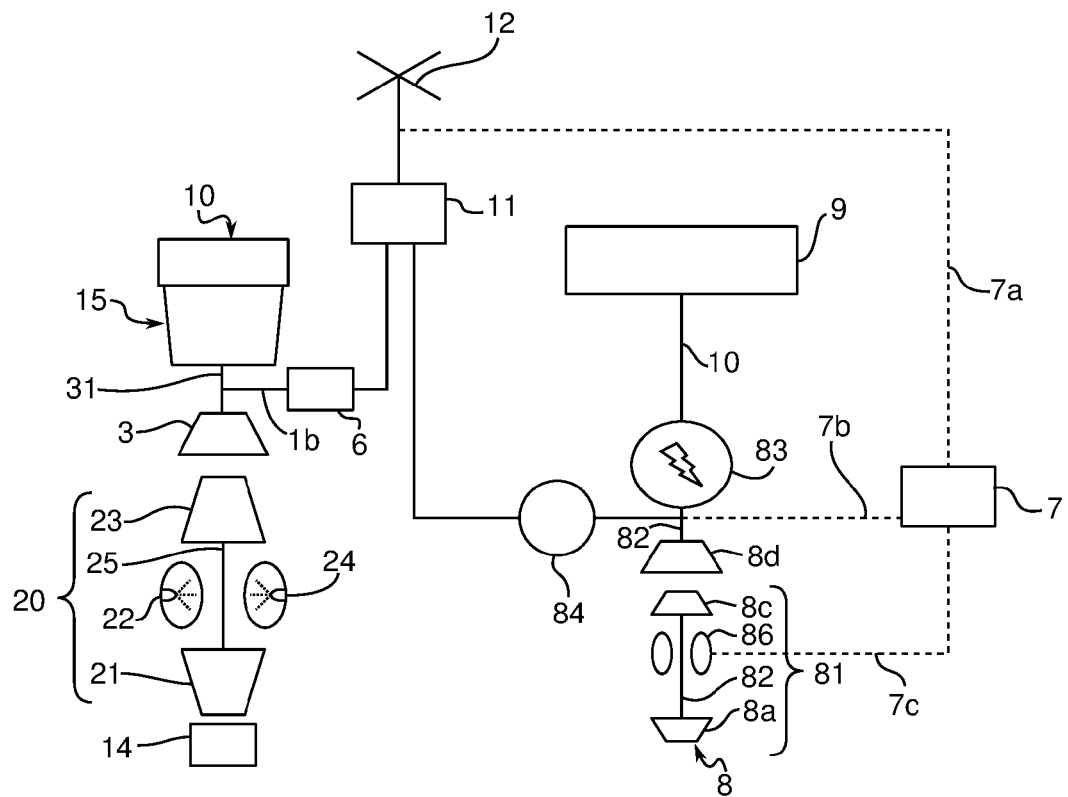
Figure 4:
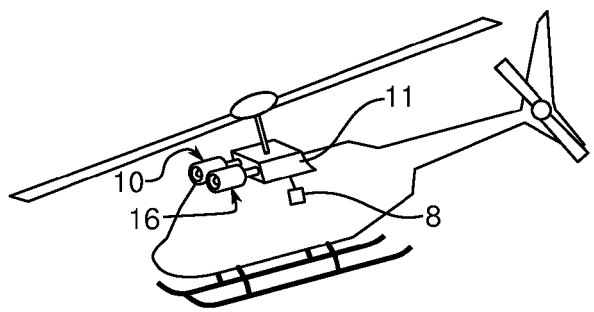
Figure 5:
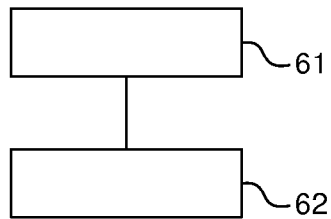

Other aims, features and advantages of the invention will emerge upon reading the following description which is given solely non-limitatively and refers to the accompanying figures, in which:

FIG. 1 is schematic view of a control device according to an embodiment of the invention according to a first operating mode, FIG. 2 is a schematic view of a control device according to an embodiment according to a second operating mode, FIG. 3 is a schematic view of an architecture of a helicopter according to an embodiment of the invention, FIG. 4 is a schematic view of a helicopter according to an embodiment of the invention, FIG. 5 is a schematic view of a control method according to an embodiment of the invention.

6. DETAILED DESCRIPTION OF AN EMBODIMENT OF THE INVENTION

In the drawings, the scales and proportions are not strictly respected, for purposes of illustration and clarity.

FIG. 3 illustrates in a simplified manner an architecture of a twin-engine helicopter according to an embodiment of the invention. In FIG. 3, only one main engine 10 is shown for purposes of clarity, the other engine being identical and connected symmetrically to a power transmission box 11, itself connected to the rotor 12 of the helicopter. The main engines, such as the main engine 10 shown, comprise a gas generator 20 formed by an assembly consisting of a compressor 21 coupled to a combustion chamber 22, itself coupled to a turbine 23. The engine also comprises a free turbine 3 driving a power transmission shaft 31. The gas generator 20 and the free turbine 3 are disposed between an air inlet 14 and a gas exhaust pipe 15.

In operation, the chamber 22 is supplied with fuel by injectors 24, in which air compressed by the compressor 21 is also aspirated. The combustion of the air/fuel mixture in the chamber 22 supplies high-velocity energetic gases. These hot gases are first of all expanded in the turbine 23, which drives the compressor 21 mechanically via a high-pressure drive shaft 25, and then in the free turbine 3.

The main engine 10 transmits mechanical power to the rotor 12 of the helicopter and to equipment or accessories via a speed reduction box 6, itself connected to a power transmission box 11.

The architecture according to the invention also comprises an auxiliary engine 8 that comprises, like the main engines, a gas generator 81 comprising a compressor 8a, a combustion chamber 86 and a turbine 8c. The auxiliary engine also comprises a free turbine 8d. The drive shaft 82 of the free turbine 8d of the auxiliary engine 8 is coupled to an electricity generator 83 that converts the mechanical energy transmitted by the shaft 82 into electrical energy. The auxiliary engine 8 is therefore capable of supplying non-thrust electrical energy to an on-board system 9 of the helicopter.

The auxiliary engine is also connected to the power transmission box 11 by a disengageable mechanism 84 controlled so as to be able to supply, on command, thrust power to the rotor of the helicopter, in certain flight phases of the helicopter.

The architecture further comprises a device 7 for controlling the speed of the auxiliary engine 8. This control device 7 receives information representing the speed 7a of the rotor of the helicopter and information representing the rotation speed 7b of the free turbine 8d of the auxiliary engine 8 and outputs a speed setpoint 7c. This speed setpoint is for example converted into a setpoint for fuel injected into the combustion chamber 86.

Hereinafter, the control device 7 will be explained in detail, in particular in relation to FIGS. 1 and 2.

The control device 7 comprises a proportional-integral controller 30 having a proportional gain Kp and an integral gain Ki, which are dependent on the rotation speed of the gas generator 8a of the auxiliary engine 8.

The controller 30 is configured to receive a signal Se representing a speed error 7b of the free turbine 8d of the auxiliary engine 8. This signal Se is, throughout the text, designated by the words error signal.

The controller 30 is also configured to generate a signal Sc for correcting the drive speed of the gas generator 81 of the auxiliary engine 8.

To do this, the controller 30 comprises a proportional module comprising a proportional gain Kp so as to supply a signal Sp proportional to the error signal. The regulator 30 also comprises an integral module comprising an integral gain Ki and a feedback loop 31 so as to supply an integrated signal Si. The gains Kp and Ki are dependent on the rotation speed of the gas generator 81 of the auxiliary engine 8.

The feedback loop 31 of the integral module comprises two circuits 41, 42 and a selector 33 configured to define which of the two circuits is to be activated according to the conditions. The first and second circuits 41, 42 share in common the part 40 of the feedback loop 31 that conveys an image of the signal Si to each of the two circuits.

The first circuit 41 is configured to supply a memory signal Sm that is an image of the integrated signal Si.

The second circuit 42 is configured to supply a memory signal Sm proportional to said integrated signal Si in accordance with a cancellation gain Ka of less than 1, such that the integrated signal Si output by the integrating module is gradually cancelled out when the control error is small. This second circuit 42 therefore forms a compensation circuit.

The selector 33 is configured to select the first circuit or the second circuit according to the results of a test on a measurement representing the rotation speed of said free turbine of said auxiliary engine.

The integrated signal Si is therefore obtained either by a conventional integral control or by a compensated integral control, the return loop of which is corrected by a cancellation gain Ka, this choice being made on the basis of a criterion based on a measurement representing the rotation speed of the free turbine of the auxiliary engine.

The feedback loop 31 further comprises a timer 34 for offsetting in time the integrated signal Si that is supplied to each of the two circuits 41, 42.

The selector 33 comprises two inputs: an input connected to the compensation circuit 42 and an input connected to the first circuit 41. The selector comprises an output delivering the memory signal Sm selected.

The selector 33 further comprises a comparator configured to compare the error signal Se with a predetermined droop threshold So.

The selector is configured to connect the input of the selector connected to the first circuit to the output if the comparator indicates that the speed error, in absolute value, is higher than the predetermined droop threshold. In other words, the selector supplies the integrated signal Si as a memory signal Sm if the speed error, in absolute value, is higher than the predetermined droop threshold.

The selector is also configured to connect the input connected to the compensation circuit to the output if the comparator indicates that the speed error, in absolute value, is lower than the predetermined droop threshold. In other words, the selector supplies the signal delivered by the compensation circuit as a memory signal Sm if the speed error is lower, in absolute value, than said threshold So. In this case, the integrated signal Si output by the integrator is gradually cancelled.

FIG. 1 is a schematic view of the control device, in which the selector is switched in the position corresponding to the compensation used by the compensation circuit. In other words, the output of the selector supplies the memory signal for cancelling the integrated signal Si. FIG. 2 is a schematic view of the control device, in which the selector is switched into the non-compensation position. In other words, the output of the selector supplies the integrated signal. The two positions—compensation and non-compensation—are shown schematically by the position of the switch 36.

The control device also comprises an adder 50 configured to add the correction signal Sc generated by the proportional-integral controller 30 and a signal Sa corresponding to a target operating point of the auxiliary engine dependent on the flight conditions of the helicopter, to supply a setpoint signal Scons to the gas generator of the auxiliary engine.

According to another embodiment (not shown in the drawings), the cancellation gain of the compensation circuit is dependent on the rotation speed error of the free turbine of the auxiliary engine, which makes it possible to replace the selector 33 and the threshold condition So.

FIG. 4 is a schematic view of a helicopter comprising two main engines 10, 16 and an auxiliary engine 8 that are connected to a power transmission box 11. The auxiliary engine 8 is controlled by a control device according to the invention.

FIG. 5 is a schematic view of a control method according to an embodiment of the invention.

It comprises a step 61 of receiving a signal representing a speed error of said free turbine of said auxiliary engine, referred to as an error signal, and a step 62 of generating a signal for correcting the drive speed of the auxiliary engine resulting from the addition of a signal proportional to said error signal and a signal, referred as an integrated signal, resulting from the addition of a signal proportional to said error signal in accordance with an integral gain Ki and a signal, referred to as a memory signal Sm, dependent on a measurement representing the rotation speed of said free turbine of said of said auxiliary engine 8.

The method according to the invention is advantageously implemented by a control device according to the invention, and a control device according to the invention advantageously implements a method according to the invention.

The invention claimed is:

1. A device for controlling an auxiliary engine comprising a gas generator and a free turbine suitable for being able to be connected mechanically to the rotor of a helicopter in order to supply it with thrust power in addition to thrust power supplied by the main engines,
wherein said control device comprises a proportional-integral controller having a proportional gain and an integral gain, which are dependent on the rotation speed of said gas generator of said auxiliary engine of the helicopter, said controller being configured to receive a signal representing a speed error of said free turbine of said auxiliary engine referred to as an error signal, and to generate a signal for correcting the drive speed of said gas generator of said auxiliary engine, said correction signal being obtained by adding a signal proportional to said error signal in accordance with said proportional gain, and a signal, referred to as an integrated signal, resulting from the addition of a signal proportional to said error signal in accordance with said integral gain and a signal, referred to as a memory signal, supplied by a feedback loop of said integrated signal, said memory signal being dependent on a measurement representing the rotation speed of said free turbine of said auxiliary engine.

2. The control device according to claim 1, wherein said feedback loop comprises:
a first circuit configured to supply a memory signal that is an image of said integrated signal,
a second circuit configured to supply a memory signal proportional to said integrated signal in accordance with a gain, referred to as a cancellation gain, of less than 1,
a selector configured to select said first circuit or said second circuit according to the results of a test on a measurement representing the rotation speed of said free turbine of said auxiliary engine.

3. The control device according to claim 2, wherein said test performed by said selector consists in comparing said error signal with a predetermined droop threshold so as to be able to activate said first circuit if the speed error, in absolute value, is higher than said predetermined droop threshold and to activate said second circuit if the speed error, in absolute value, is lower than said threshold, such that said integrated signal is gradually cancelled.

4. The control device according to claim 2, wherein said cancellation gain of said second circuit is dependent on the speed error of said free turbine of said auxiliary engine.

5. The control device according to claim 1,
wherein it further comprises an adder configured to add said correction signal generated by said proportional-integral controller and a signal corresponding to a target operating point of said auxiliary engine that depends on said flight conditions of the helicopter, to supply a setpoint signal to said gas generator of said auxiliary engine.

6. An architecture of a multi-engine helicopter comprising a thrust power unit comprising main engines suitable for being connected to a power transmission box driving a rotor of the helicopter, and an auxiliary engine comprising a gas generator and a free turbine, said auxiliary engine being suitable for being able to be connected firstly to an on-board system the helicopter in order to be able to supply said on-board system with electrical energy on the ground, and secondly to said thrust power unit in order to be able to supply extra thrust power during a flight of the helicopter, wherein said architecture further comprises a device for controlling said auxiliary engine according to claim 1, so as to be able to adapt, during a flight of the helicopter, the thrust power supplied by said auxiliary engine to said thrust power unit, independently of any balancing between said main engines and the auxiliary engine.

7. A helicopter comprising an architecture according to claim 6.

8. A method for controlling an auxiliary engine comprising a gas generator and a free turbine suitable for supplying thrust power to a helicopter rotor, wherein it comprises the following steps:

receiving a signal representing a speed error of said free turbine of said auxiliary engine, referred to as an error signal, generating a signal for correcting the drive speed of said gas generator of said auxiliary engine resulting from the addition of a signal proportional to said error signal in accordance with a proportional gain, and a signal, referred to as an integrated signal, resulting from the addition of a signal proportional to said error signal in accordance with an integral gain and a signal, referred to as a memory signal, dependent on a measurement representing the rotation speed of said free turbine of said auxiliary engine.

9. The method according to claim 8, wherein said memory signal is a signal obtained by a selection between a signal that is an image of said integrated signal and a signal proportional to said integrated signal in accordance with a gain, referred to as a cancellation gain, of less than 1, the selection being dependent on the results of a test on a measurement representing the rotation speed of said free turbine of said auxiliary engine.

10. The method according to claim 9, wherein said selection test consists in comparing said error signal with a predetermined droop threshold and choosing said signal that is an image of the integrated signal if the speed error, in absolute value, is higher than said predetermined droop threshold and choosing said signal proportional to said integrated signal in accordance with said cancellation gain if the speed error, in absolute value, is lower than said threshold.

* * * * *